United States Patent
C. et al.

(10) Patent No.: US 12,106,478 B2
(45) Date of Patent: Oct. 1, 2024

(54) DEEP LEARNING BASED MEDICAL SYSTEM AND METHOD FOR IMAGE ACQUISITION

(71) Applicant: GE Precision Healthcare LLC, Wauwatosa, WI (US)

(72) Inventors: Florintina C., Bangalore (IN); Deepa Anand, Bangalore (IN); Dattesh Dayanand Shanbhag, Bangalore (IN); Chitresh Bhushan, Glenville, NY (US); Radhika Madhavan, Niskayuna, NY (US)

(73) Assignee: GE Precision Healthcare LLC, Wauwatosa, WI (US)

( * ) Notice: Subject to any disclaimer, the term of this patent is extended or adjusted under 35 U.S.C. 154(b) by 714 days.

(21) Appl. No.: 17/203,196

(22) Filed: Mar. 16, 2021

(65) Prior Publication Data
US 2022/0301163 A1   Sep. 22, 2022

(51) Int. Cl.
*G06T 7/00* (2017.01)
*G06N 20/00* (2019.01)
*G06T 3/147* (2024.01)
*G06T 7/11* (2017.01)

(52) U.S. Cl.
CPC .......... *G06T 7/0014* (2013.01); *G06N 20/00* (2019.01); *G06T 3/147* (2024.01); *G06T 7/11* (2017.01); *G06T 2207/20081* (2013.01); *G06T 2207/20084* (2013.01); *G06T 2207/30008* (2013.01)

(58) Field of Classification Search
CPC ....... G06T 7/0014; G06T 7/11; G06T 3/0075; G06T 2207/20081; G06T 2207/20084; G06T 2207/30008; G06N 20/00
USPC ......................................................... 382/128
See application file for complete search history.

(56) References Cited

U.S. PATENT DOCUMENTS

| | | | |
|---|---|---|---|
| 2019/0021677 A1* | 1/2019 | Grbic | G06T 7/11 |
| 2022/0198784 A1* | 6/2022 | Toporek | G06V 10/7747 |
| 2022/0253651 A1* | 8/2022 | Smirnov | G06V 10/751 |

OTHER PUBLICATIONS

Multiple Sclerosis Lesion Synthesis in MRI using an encoder-decoder U-NET, Mostafa Salem, Sergi Valverde, Mariano Cabezas, Deborah Pareto, Arnau Oliver, Joaquim Salvi, Alex Rovira, Zavier Llad, Elseveier Press, Jan. 18, 2019., (Year: 2019).*

(Continued)

*Primary Examiner* — Nancy Bitar
*Assistant Examiner* — Heath E. Wells

(57) ABSTRACT

A medical imaging system includes at least one medical imaging device providing image data of a subject and a processing system programmed to generate a plurality of training images having simulated medical conditions by blending a pathology region from a plurality of template source images to a plurality of target images. The processing system is further programmed to train a deep learning network model using the plurality of training images and input the image data of the subject to the deep learning network model. The processing system is further programmed to generate a medical image of the subject based on the output of the deep learning network model.

18 Claims, 10 Drawing Sheets

(56) References Cited

OTHER PUBLICATIONS

Koch et al., "Rapid calculations of susceptibility-induced magnetostatic field perturbations for in vivo magnetic resonance," 2006 Phys. Med. Biol. 51 6381, 23 pages.

Salem et al., "Multiple Sclerosis Lesion Synthesis in MRI using an encoder-decoder U-NET," https://arxiv.org/pdf/1901.05733.pdf, Jan. 17, 2019, 17 pages.

\* cited by examiner

DEEP LEARNING BASED MEDICAL SYSTEM AND METHOD FOR IMAGE ACQUISITION

BACKGROUND

The field of the disclosure relates generally to medical imaging systems and methods, and more particularly, to techniques of generating simulated images with patient conditions/pathology for machine learning-based applications.

In modern healthcare facilities, non-invasive medical imaging systems are often used for identifying, diagnosing, and treating physical conditions. Medical imaging encompasses different non-invasive techniques used to image and visualize the internal structures and/or functional behavior (such as chemical or metabolic activity) of organs and tissues within a patient. Currently, a number of modalities of medical diagnostic and imaging systems exist, each typically operating on different physical principles to generate different types of images and information. These modalities include ultrasound systems, computed tomography (CT) systems, X-ray systems (including both conventional and digital or digitized imaging systems), positron emission tomography (PET) systems, single photon emission computed tomography (SPECT) systems, and magnetic resonance (MR) imaging systems.

Similar to other technology domains, Deep learning (DL) has made a significant foray into the medical imaging domain as well. DL is being used in many of the imaging modalities including, CT, PET, X-ray, SPECT and MR imaging systems. Deep learning uses efficient techniques to make the diagnosis in state of the art manner. In general, DL is a subset of machine learning where artificial neural network models learn from large amounts of training data. Applications of deep learning include medical image pre-processing (i.e., de-noising and enhancement), medical image segmentation, and medical image object detection and recognition.

In DL based medical imaging, the expectation is for the DL network to work robustly across a range of patient conditions such as pathologies of varying degrees, implants etc. The location and degree of impact of such patient conditions on the medical images can be dramatic and potentially affect the performance of DL techniques. For example, in a magnetic resonance imaging (MRI) system, the metal implant can destroy the signal in the vicinity of the tissue and obscure pertinent landmarks. Another example, could include, fracture condition, which distorts the bone structure or a topology of a pathology, e.g. BIRADS classification requiring certain shapes for classification.

Therefore, there is a need for an improved magnetic resonance imaging system and method.

BRIEF DESCRIPTION

In accordance with an embodiment of the present technique, a medical imaging system is provided. The system includes at least one medical imaging device providing image data of a subject and a processing system programmed to generate a plurality of training images having simulated medical conditions. The processing system is further programmed to train a deep learning network model using the plurality of training images and input the image data of the subject to the deep learning network model. The processing system is further programmed to generate a medical image of the subject based on the output of the deep learning network model. The processing system generates the plurality of training images by blending a pathology region from a plurality of template source images to a plurality of target images.

In accordance with another embodiment of the present technique, a method for imaging a subject is presented. The method includes generating image data of the subject with a medical imaging device and generating a plurality of training images having simulated medical conditions by blending a pathology region from a plurality of template source images to a plurality of target images. The method further includes training a deep learning network model using the plurality of training images and providing the image data of the subject as an input to the deep learning network model. The method also includes generating a medical image of the subject based on the output of the deep learning network model.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
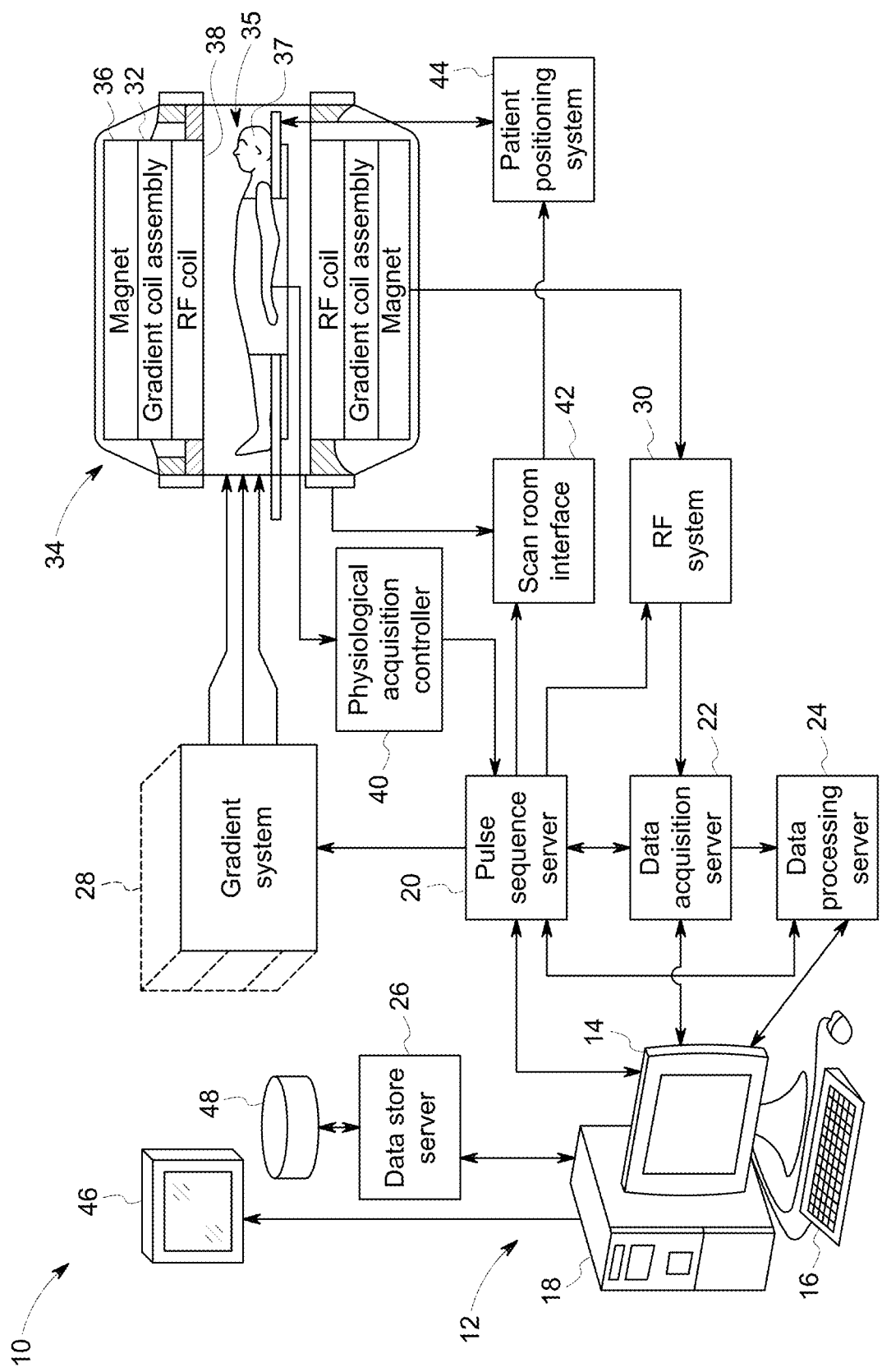
FIG. 1 is a schematic diagram of an exemplary magnetic resonance imaging (MRI) system in accordance with an embodiment of the present technique.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present embodiments, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments. Furthermore, the terms "circuit" and "circuitry" and "controller" may include either a single component or a plurality of components, which are either active and/or passive and are connected or otherwise coupled together to provide the described function.

The presented technique includes systems and methods of removing artifacts in medical images or classifying images in the presence of artifacts using a deep learning model. As used herein, a subject is a human (or patient), an animal, or a phantom. Unlike signals, which represent the anatomies or structures of the subject, artifacts are visual anomalies in the medical images that are not present in the subject, but may be caused by subject conditions such as metal implants or fractures in a human body. Method aspects will be in part apparent and in part explicitly discussed in the following description.

In general, the location and degree of impact of patient conditions (e.g., metal implants or fractures) on the medical images can be dramatic and potentially affect the performance of DL techniques. One way to mitigate this problem is to gather such relevant patient data to expose the training of the DL network to learn the intended task despite the presence of such patient conditions. Some of these conditions occur very rarely thus limiting the number of examples that can be used to train the networks.

Another approach would be to use bio-physical models which may not exactly replicate the patient conditions besides being computationally intensive. Deep-learning based image synthesis approaches do exist. However, their applicability is marred by the inflexibility to control the contrast, location, intensity variations etc. in synthetic data; besides requiring large amounts of data to generate the model.

The embodiments presented herein are related to techniques of generating training images having simulated patient conditions for DL-based applications. It should also be noted that although, the technique herein is presented with respect to a magnetic resonance imaging (MRI) system, the present technique may also be employed in other imaging systems that use DL algorithms. Further, although, the technique herein is presented in detail with respect to metal implants, the technique may also be used for other medical conditions such as a bone fracture.

FIG. 1 illustrates a schematic diagram of an exemplary MRI system 10. In the exemplary embodiment, the MRI system 10 includes a workstation 12 having a display 14 and a keyboard 16. The workstation 12 includes a processor 18, such as a commercially available programmable machine running a commercially available operating system. The workstation 12 provides an operator interface that allows scan prescriptions to be entered into the MRI system 10. The workstation 12 is coupled to a pulse sequence server 20, a data acquisition server 22, a data processing server 24, and a data store server 26. The workstation 12 and each server 20, 22, 24, and 26 communicate with each other.

In the exemplary embodiment, the pulse sequence server 20 responds to instructions downloaded from the workstation 12 to operate a gradient system 28 and a radiofrequency ("RF") system 30. The instructions are used to produce gradient and RF waveforms in MR pulse sequences. An RF coil 38 and a gradient coil assembly 32 are used to perform the prescribed MR pulse sequence. The RF coil 38 is shown as a whole body RF coil. The RF coil 38 may also be a local coil that may be placed in proximity to the anatomy to be imaged, or a coil array that includes a plurality of coils.

In the exemplary embodiment, gradient waveforms used to perform the prescribed scan are produced and applied to the gradient system 28, which excites gradient coils in the gradient coil assembly 32 to produce the magnetic field gradients $G_x$, $G_y$, and $G_z$ used for position-encoding MR signals. The gradient coil assembly 32 forms part of a magnet assembly 34 that also includes a polarizing magnet 36 and the RF coil 38.

In the exemplary embodiment, the RF system 30 includes an RF transmitter for producing RF pulses used in MR pulse sequences. The RF transmitter is responsive to the scan prescription and direction from the pulse sequence server 20 to produce RF pulses of a desired frequency, phase, and pulse amplitude waveform. The generated RF pulses may be applied to the RF coil 38 by the RF system 30. Responsive MR signals detected by the RF coil 38 are received by the RF system 30, amplified, demodulated, filtered, and digitized under direction of commands produced by the pulse sequence server 20. The RF coil 38 is described as a transmitter and receiver coil such that the RF coil 38 transmits RF pulses and detects MR signals. In one embodiment, the MRI system 10 may include a transmitter RF coil that transmits RF pulses and a separate receiver coil that detects MR signals. A transmission channel of the RF system 30 may be connected to a RF transmission coil and a receiver channel may be connected to a separate RF receiver coil. Often, the transmission channel is connected to the whole body RF coil 38 and each receiver section is connected to a separate local RF coil.

In the exemplary embodiment, the RF system 30 also includes one or more RF receiver channels. Each RF receiver channel includes an RF amplifier that amplifies the MR signal received by the RF coil 38 to which the channel is connected, and a detector that detects and digitizes the I and Q quadrature components of the received MR signal. The magnitude of the received MR signal may then be determined as the square root of the sum of the squares of the I and Q components as in Eq. (1) below:

$$M = \sqrt{I^2 + Q^2} \qquad (1);$$

and the phase of the received MR signal may also be determined as in Eq. (2) below:

$$\varphi = \tan^{-1}\left(\frac{Q}{I}\right). \qquad (2)$$

In the exemplary embodiment, the digitized MR signal samples produced by the RF system 30 are received by the data acquisition server 22. The data acquisition server 22 may operate in response to instructions downloaded from the workstation 12 to receive real-time MR data and provide buffer storage such that no data is lost by data overrun. In some scans, the data acquisition server 22 does little more than pass the acquired MR data to the data processing server 24. In scans that need information derived from acquired MR data to control further performance of the scan, however, the data acquisition server 22 is programmed to produce the needed information and convey it to the pulse sequence server 20. For example, during prescans, MR data is acquired and used to calibrate the pulse sequence performed by the pulse sequence server 20. Also, navigator signals may be acquired during a scan and used to adjust the operating parameters of the RF system 30 or the gradient system 28, or to control the view order in which k-space is sampled.

In the exemplary embodiment, the data processing server 24 receives MR data from the data acquisition server 22 and processes it in accordance with instructions downloaded from the workstation 12. Such processing may include, for example, Fourier transformation of raw k-space MR data to produce two or three-dimensional images, the application of filters to a reconstructed image, the performance of a back-projection image reconstruction of acquired MR data, removal of artifacts in the MR data, classification of MR images in presence of artifacts, the generation of functional MR images, and the calculation of motion or flow images.

In the exemplary embodiment, images reconstructed by the data processing server 24 are conveyed back to, and stored at, the workstation 12. In some embodiments, real-time images are stored in a database memory cache (not shown in FIG. 1), from which they may be output to operator display 14 or a display 46 that is located near the magnet assembly 34 for use by attending physicians. Batch mode images or selected real time images may be stored in a host database on disc storage 48 or on a cloud. When such images have been reconstructed and transferred to storage, the data processing server 24 notifies the data store server 26. The workstation 12 may be used by an operator to archive the images, produce films, or send the images via a network to other facilities.

As discussed earlier, the acquired MR data from the data acquisition server 22 may include artifacts due to pathology condition of the subject such as metal implants or fractures in a human body. Using deep learning to directly remove these artifacts provides superior performance to conventional methods.

Figure 2A:
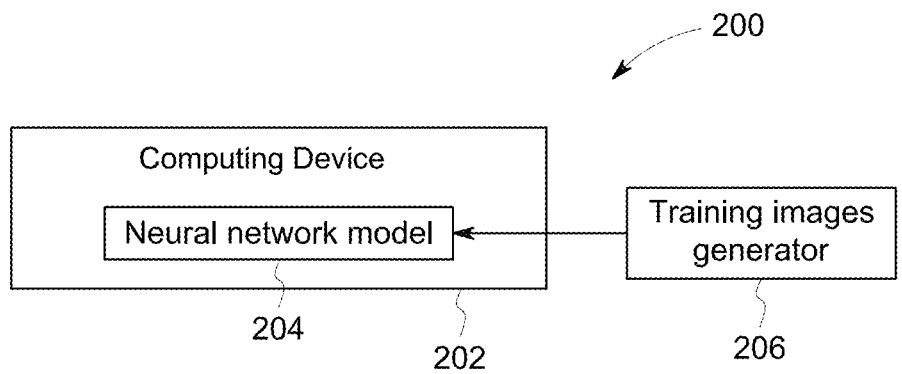
FIG. 2A is an exemplary truncation artifact reduction/classifier system which is used in the MRI system of FIG. 1.

FIG. 2A is a schematic diagram of an exemplary artifact reduction/classifier system 200 which is used in MRI system 10 of FIG. 1. In the exemplary embodiment, the system 200 includes a computing device 202 which is configured to classify images or reduce artifacts therein. The computing device 202 includes a DL network model 204. The system 200 also includes a training images generator 206 to generate training images in accordance with an embodiment of the present technique. The training images from the training images generator 206 are used to train the DL network model 204. In one embodiment of the present technique, a training images generator is presented to generate these training images having simulated medical conditions. In one embodiment, the training images are images having simulated artifacts which are result of a medical condition of the patient. The computing device 202 may then use the trained DL network model 204 to generate medical images with classification as having a certain medical condition or medical images with reduced artifact. The computing device 202 may be included in the workstation 12 of the MRI system 10, or may be included on a separate computing device that is in communication with the workstation 12. Further, in another embodiment, training images generator 206 may be included on a separate computing device and may generate the training images well ahead of the actual operation of the MRI system 10.

Figure 2B:
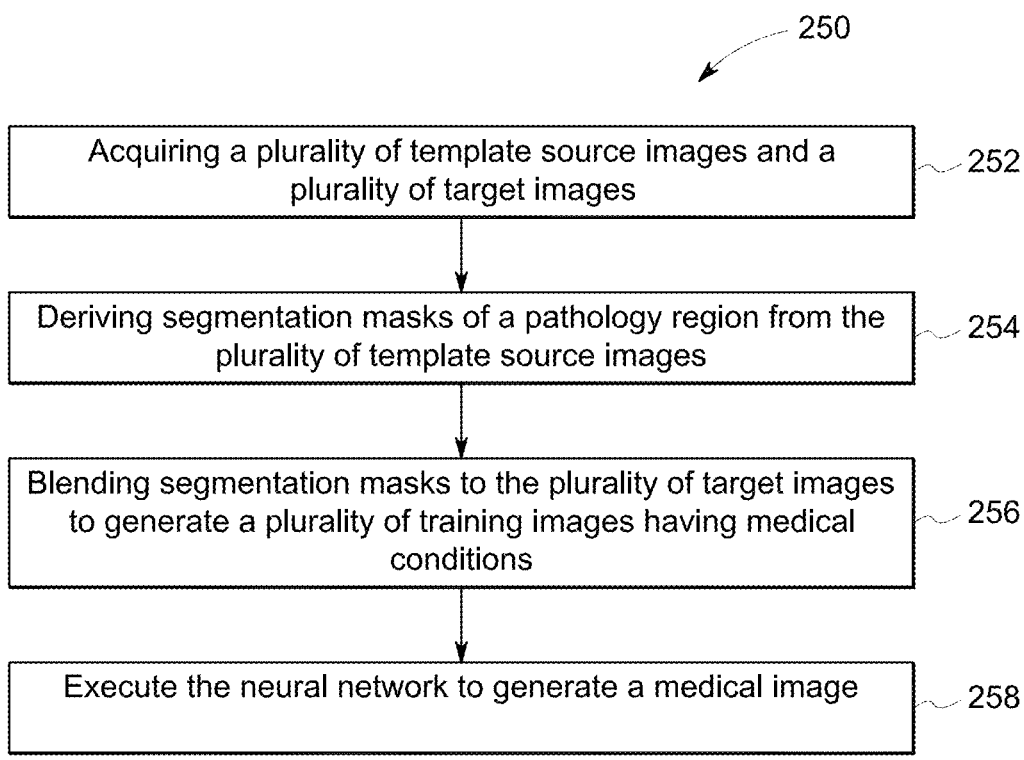
FIG. 2B is a flow chart of an exemplary method that may be implemented in system of FIG. 2A in accordance with an embodiment of the present technique.

FIG. 2B is a flow chart of an exemplary method 250. The method 250 may be implemented on the artifact reduction/classifier system 200. In the exemplary embodiment, the method includes acquiring 252 a plurality of template source images and a plurality of target images. The plurality of template source images includes representative examples of medical conditions of the patient. For example, the plurality of template source images may include images of the patient having metal implants in knee or other body parts. The plurality of template source images may also include images with fractured bones. Further, the plurality of target images is selected from a set of patient images having no medical conditions. Both, the template source images and target images may be stored in a historical image database of the same patient or of various pathologies of different patients from which these images may be acquired when required.

The method 250 further includes deriving 254 segmentation masks of a pathology region from the plurality of template source images. The method 250 also includes blending 256 segmentation masks to the plurality of target images to generate a plurality of training images having medical conditions. Finally, the DL network model is executed at step 258 to generate a medical image of the patient having reduced artifacts or medical image with classification as having a certain medical condition. In one embodiment, the method steps 252, 254 and 256 may be implemented in training images generator 206 of FIG. 2A.

Figure 3:
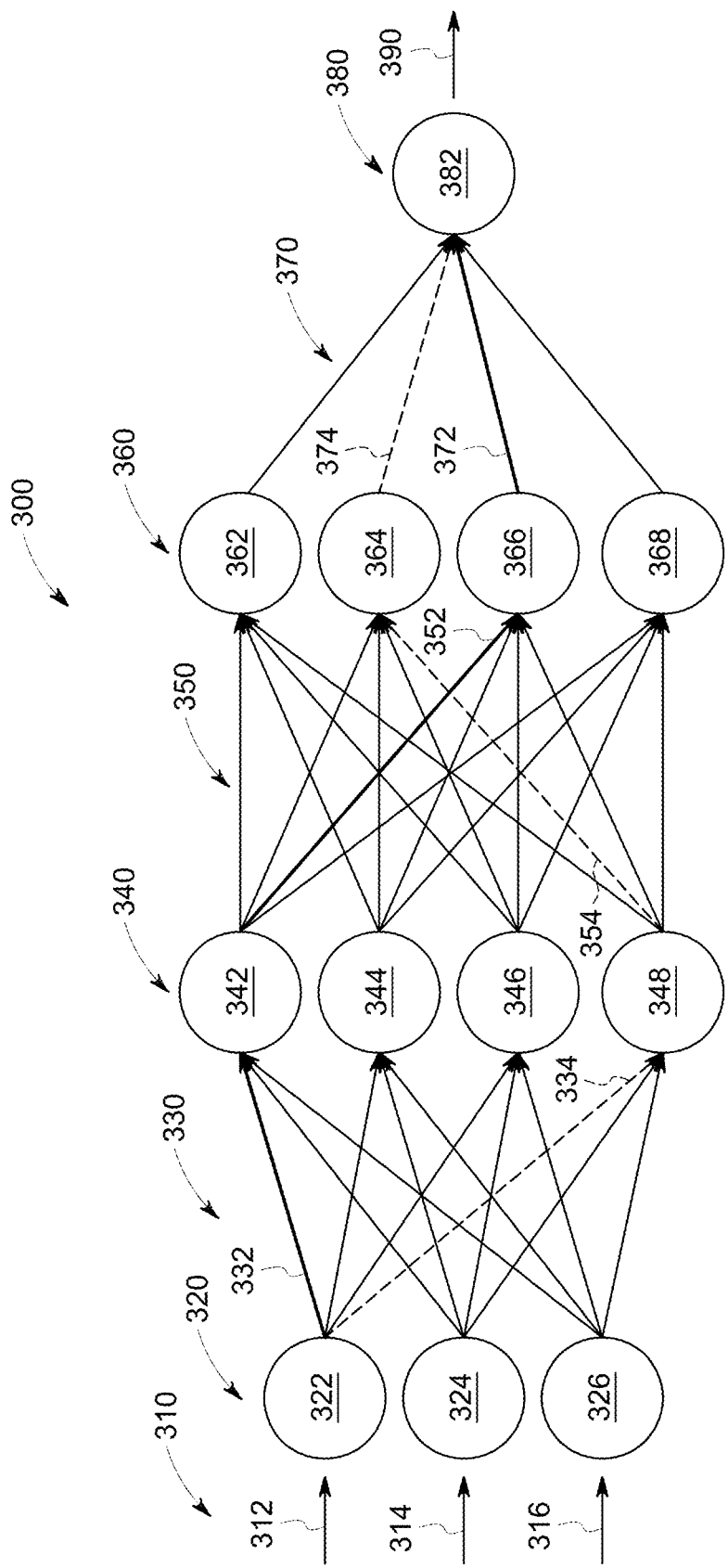
FIG. 3 is a schematic diagram of an example DL network that may be used in the truncation artifact reduction/classifier system of FIG. 2A.

FIG. 3 is a representation of an example DL network model 300 that may be used as the DL network model 204 in the embodiment of 200. The example DL network model 300 includes layers 320, 340, 360, and 380. The layers 320 and 340 are connected with neural connections 330. The layers 340 and 360 are connected with neural connections 350. The layers 360 and 380 are connected with neural connections 370. Data flows forward via inputs 312, 314, 316 from the input layer 320 to the output layer 380 and to an output 390. The inputs 312, 314, 316 may be source images and output 390 may be a target images.

The layer 320 is an input layer that, in the example of FIG. 3, includes a plurality of nodes 322, 324, 326. The layers 340 and 360 are hidden layers and include, the example of FIG. 3, nodes 342, 344, 346, 348, 362, 364, 366, 368. The DL network model 300 may include more or less hidden layers 340 and 360 than shown. The layer 380 is an output layer and includes, in the example of FIG. 3 a node 382 with an output 390. Each input 312-316 corresponds to a node 322-326 of the input layer 320, and each node 322-326 of the input layer 320 has a connection 330 to each node 342-348 of the hidden layer 340. Each node 342-348 of the hidden layer 340 has a connection 350 to each node 362-368 of the hidden layer 360. Each node 362-368 of the hidden layer 360 has a connection 370 to the output layer 380. The output layer 380 has an output 390 to provide an output from the example DL network model 300.

Of connections 330, 350, and 370 certain example connections 332, 352, 372 may be given added weight while other example connections 334, 354, 374 may be given less weight in the DL network model 300. Input nodes 322-326 are activated through receipt of input data via inputs 312-316, for example. Nodes 342-348 and 362-368 of hidden layers 340 and 360 are activated through the forward flow of data through the network model 300 via the connections 330 and 350, respectively. Node 382 of the output layer 380 is activated after data processed in hidden layers 340 and 360 is sent via connections 370. When the output node 382 of the output layer 380 is activated, the node 382 outputs an appropriate value based on processing accomplished in hidden layers 340 and 360 of the DL network model 300.

Figure 4:
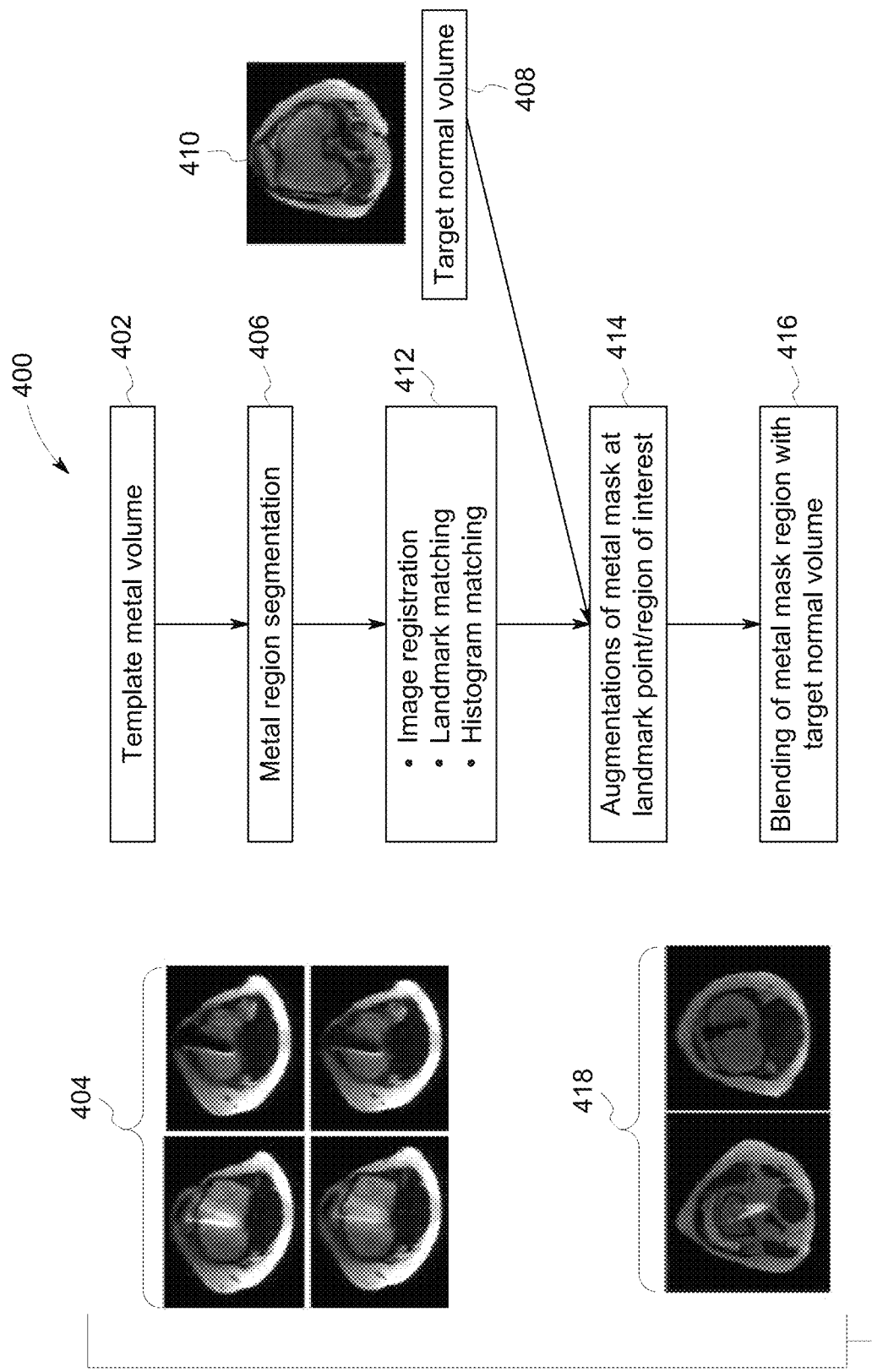
FIG. 4 is a schematic diagram of a method for generating training images for the DL network of FIG. 3 in accordance with another embodiment of the present technique.

FIG. 4 is a schematic diagram depicting a method 400 for generating training images for the DL network model in accordance with another embodiment of the present technique. The method 400 may be implemented in training images generator 206 of FIG. 2A. The method 400 includes obtaining a template metal volume at step 402. The template metal volume comprises template source images that include representative examples of metal implants in a patient knee as shown in knee images 404. The template metal volume 402 is obtained from a database of historical images of patients having metal implants such as screws located in their knees, for example. At step 406, the method includes segmenting metal regions (i.e., segmentation masks) from the template metal volume 402. For example, based on the geometry of the screw, a segmentation algorithm such as a 'connected pixel algorithm' may be used to segment or detect the metal region in the knee. In general, the segmentation algorithm determines which pixels of the images 404 belong to which objects.

At step 408, a target normal volume is obtained. The target normal volume 408 comprises target images that include representative examples of the patient knee having no medical conditions as shown in a knee image 410. Step 412 includes processing segmented metal regions. In one embodiment, processing of segmented metal region includes image registration, landmark matching, histogram matching, or combinations thereof between the segmented metal regions and target normal volume. The image registration involves transforming different sets of images into one coordinate system. In general, the segmented metal region may be from template source images which are of different people (adults or children) i.e., different knee sizes. Thus, image registration is used for scale matching to accommodate for the differences in sizes of template source images and the target images.

Further, the segmented metal regions may be at different locations in the patient body. Therefore, in one embodiment, landmark matching of segmented metal regions is used to align the segmented metal regions with the target images. As will be appreciated by those skilled in the art, a small deformation image matching or a large deformation image matching algorithm may be used for landmark matching. Finally, histogram matching may be used to normalize the segmented metal regions to compensate for variations in imaging system sensors, atmospheric conditions or intensity variations. As will be appreciated by those skilled in the art, histogram matching includes transformation of segmented metal regions to match their histogram with that of target images.

The method 400 further includes augmentations of metal regions at landmark points or regions of interest in the target images at step 414. In one embodiment, the region of interest in the target images may be determined using attention maps derived from another machine learning network or based on regions most likely to have the medical condition e.g., surgical implants. In another embodiment, region of interest in the target images may be determined using ground truth marking on the plurality of target images or using an atlas based method. Further, the augmentation process includes a series of transformations of segmented metal regions (i.e., segmentation masks). The series of transformations include rotation, resizing and elastic deformation of the segmented metal regions. In general, there are not many template source images available having medical conditions. For example, if there are 100 template source images then out of 100 only 5 or 10 may have some medical conditions such as metal implant or fracture. Further, the augmentation process may include pasting the segmentation masks from one region in the plurality of template source images to a different region in the plurality of target images. In other words, the different locations of metal implants may be simulated in one embodiment. Therefore, the augmentation step is performed to expand training images for the deep learning network model by simulating various patient conditions with variations in segmentation masks. For example, the knee screws may be augmented at 5-6 landmark points in the target image or the different sizes of screws may be augmented in the target image. Thus, from a single template source image having a medical condition it is possible to generate 20 to 30 training images with simulated medical conditions. Finally, at step 416, segmented metal regions are blended with the target images. The blending operation ensures seamless blending or pasting of augmented metal regions with the target images as shown in images 418. The blending process may include performing a contrast equalization of the plurality of template source images and the plurality of target images for obtaining perceptual smoothness between the plurality of target images and the pasted segmented masks.

Figure 5A:
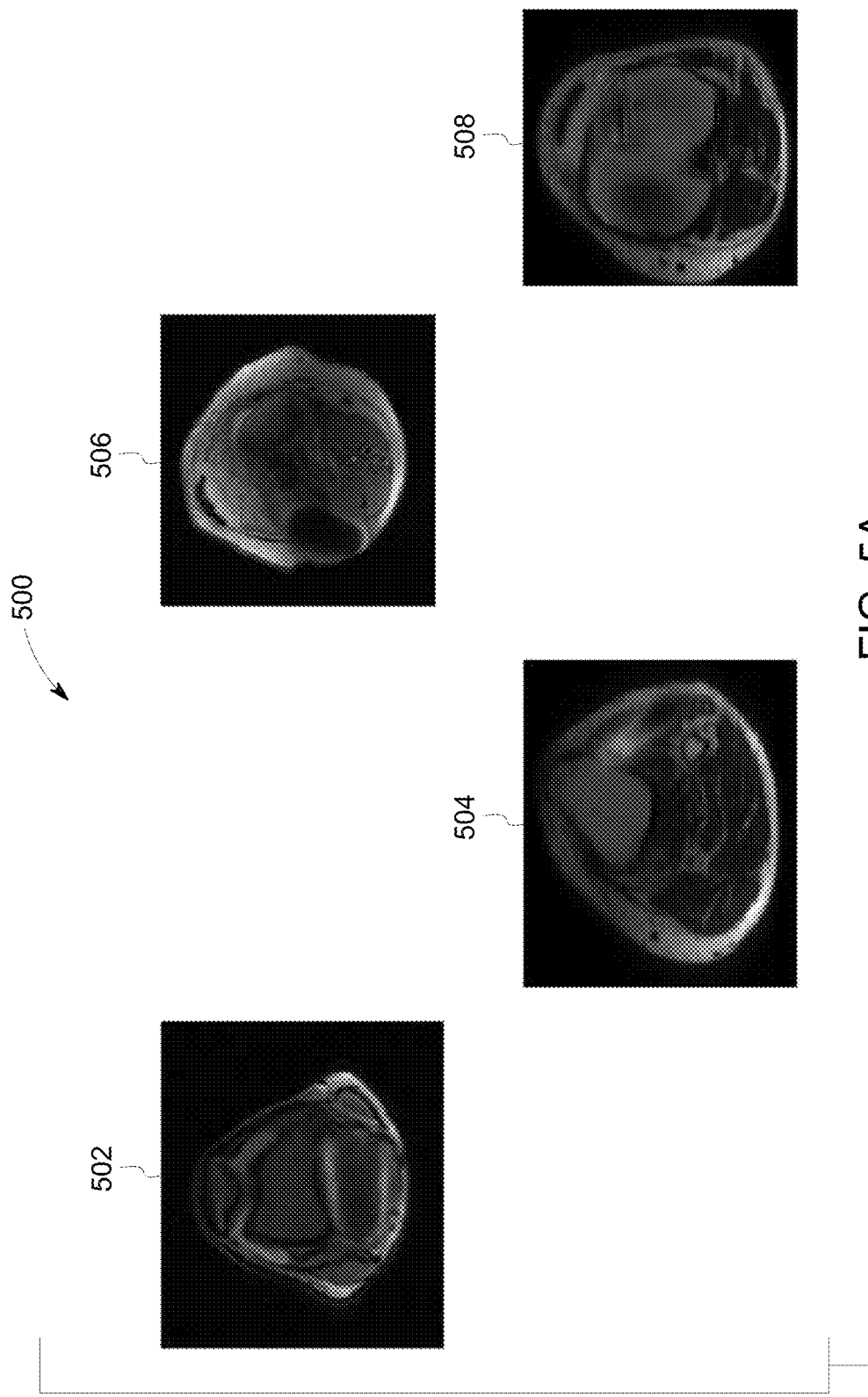
FIGS. 5A, 5B and 5C are exemplary simulated training images generated in accordance with an embodiment of the present technique.
Figure 5B:
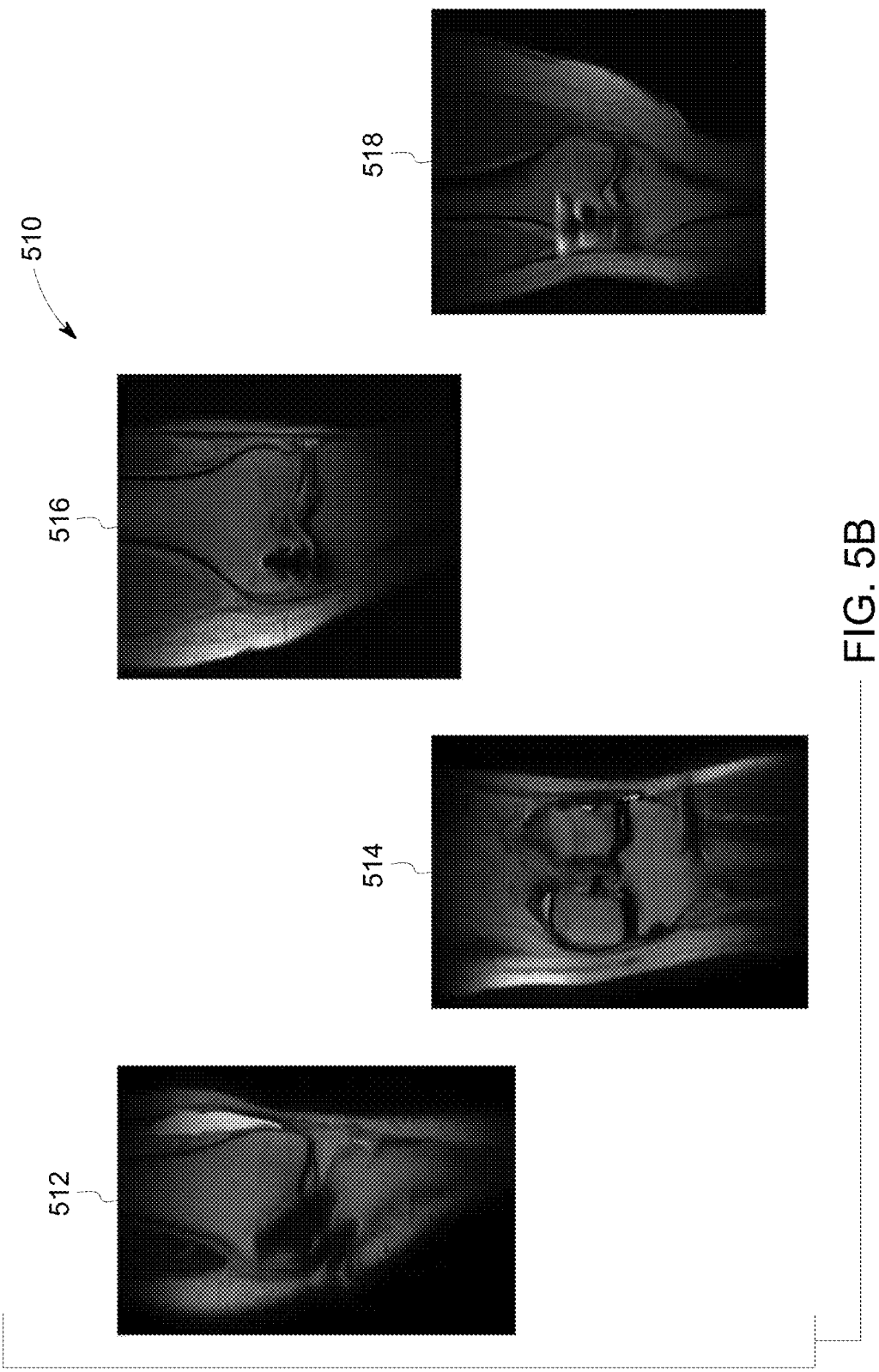
Figure 5C:
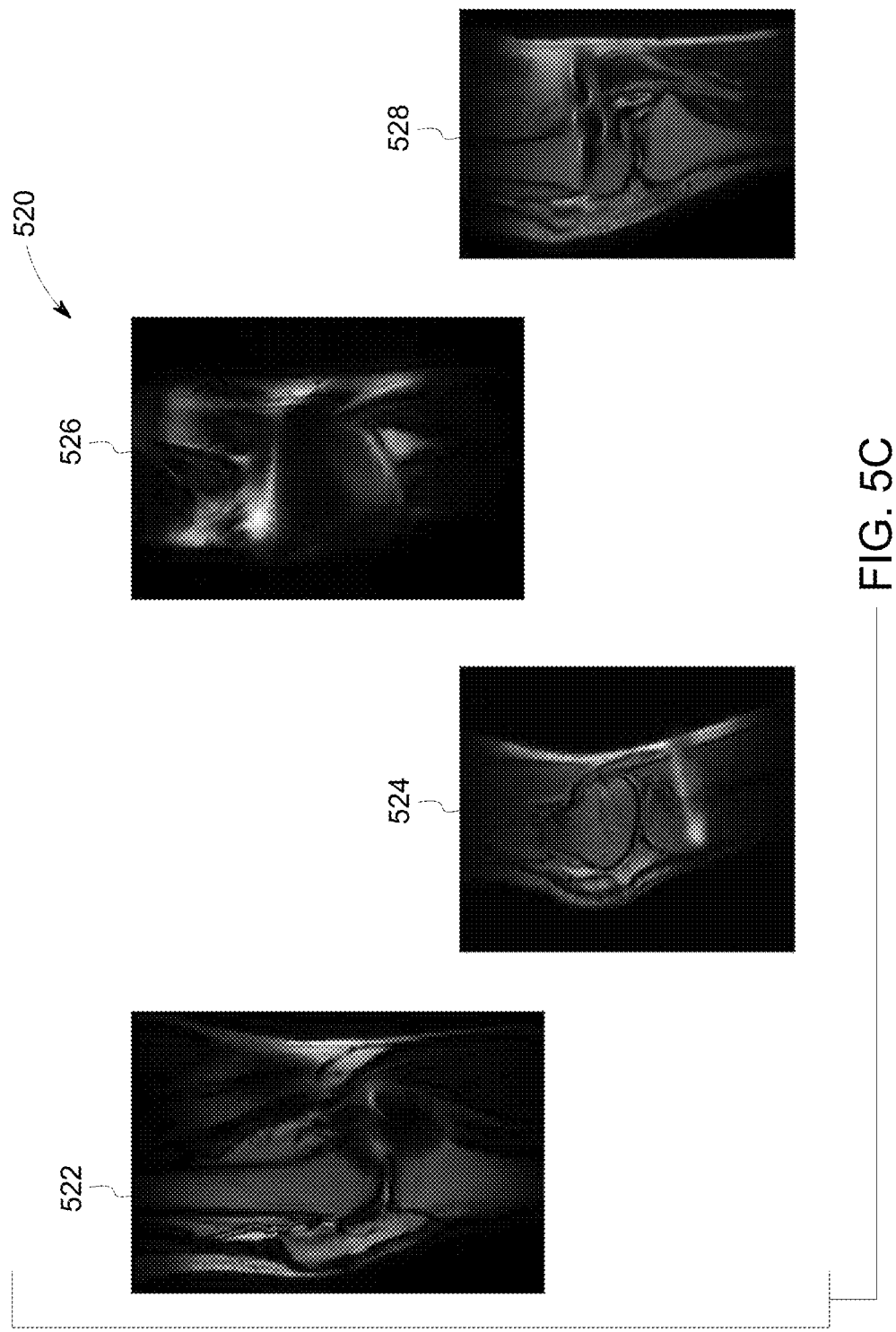

FIGS. 5A-5C are exemplary simulated training images generated in accordance with an embodiment of the present technique. FIG. 5A shows axial sample 500 of knee images. Specifically, image 502 corresponds to blending of a metal region scaled to completely obscure the femoral condyle landmark. Image 504 shows the metal region placed away from the landmark. Image 506 shows randomly placed metal and image 508 shows the blending of the metal above Tibia Landmark.

FIG. 5B shows coronal sample 510 of knee images. In FIG. 5B, image 512 corresponds to a randomly placed metal and image 514 corresponds to the metal placed below meniscus. Further, image 516 shows the metal placed on meniscus with aspect ratio of the metal being preserved. Finally, image 518 shows the metal placed above meniscus.

FIG. 5C shows sagittal sample 520 of knee images. In FIG. 5C, image 522 shows a randomly placed metal in the knee. Image 524 corresponds to the metal placed below meniscus and image 526 shows the metal placed on meniscus and made to scale the entire region of interest. Further, image 528 shows the metal placed above meniscus.

Figure 6:
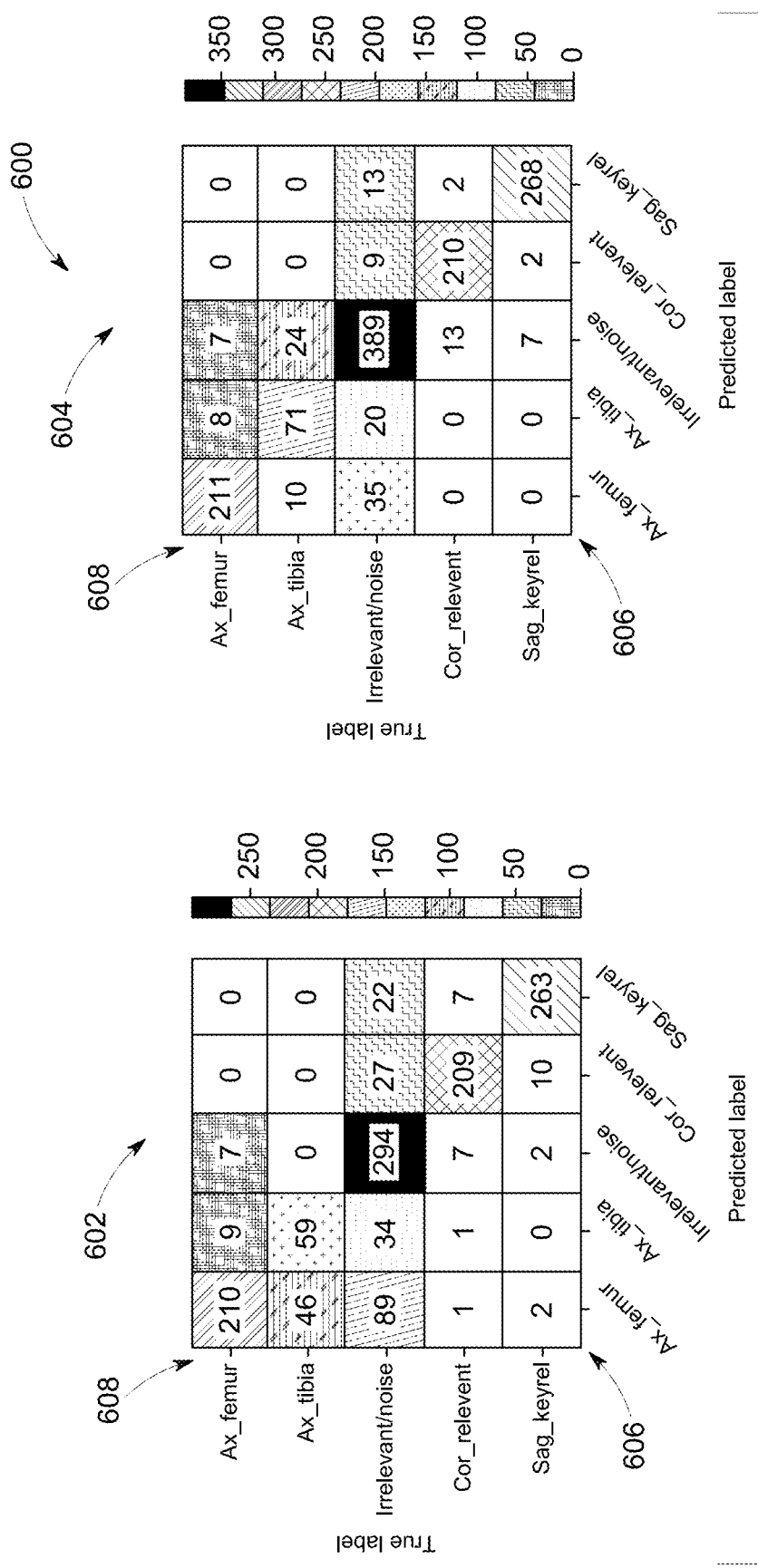
FIG. 6 is a schematic diagram depicting experimental results of a deep learning network in accordance with an embodiment of the present technique.

FIG. 6 shows a schematic diagram 600 depicting experimental results of a deep learning network model in accordance with an embodiment of the present technique. The experiment was conducted on test image samples corrupted by metal implants in actual clinical subjects. In FIG. 6, plots 602 and 604 show results of a deep learning network model trained without the simulated training images and trained with the simulated training images as described above. Horizontal axis 606 in both plots 602 and 604 shows true or real labels of test samples whereas vertical axis 608 shows predicted labels by the deep learning network model of the test samples.

In plot 602, out of total 226 test samples of Femur images, the network classified (or predicted) 210 images accurately as Femur images whereas remaining 16 images were incorrectly classified as either Tibia images (9) or as noise (7). In comparison, plot 604 classified 211 images accurately as Femur images. Further, out of total 105 test samples of Tibia images, the network in plot 602 classified 59 images accurately as Tibia images whereas the network in plot 604 classified 71 images accurately as Tibia images. Moreover, out of total 466 test samples of irrelevant or noise images, the network in plot 602 classified 294 images accurately as noise images whereas the network in plot 604 classified 389 images accurately as Tibia images. Similarly, out of total 225 test samples of coronal images, the network in plot 602 classified 209 images accurately as coronal images whereas the network in plot 604 classified 210 images accurately as coronal images. Finally, out of total 277 test samples of Sagittal images, the network in plot 602 classified 263 images accurately as Sagittal images whereas the network in plot 604 classified 268 images accurately as Sagittal images.

Overall, the experiment showed that the DL network model trained without the simulated training images i.e., plot 602 had classified 1035 images accurately out of total 1299 images i.e., accuracy of 79.67%. In comparison, the DL network model trained with simulated training images i.e., plot 604 had classified 1149 images accurately out of total 1299 images i.e., accuracy of 88.45%. Thus, there was improvement in accuracy of about 9% with the DL network model trained with the simulated training images in accordance with the embodiment of the present technique.

Figure 7:
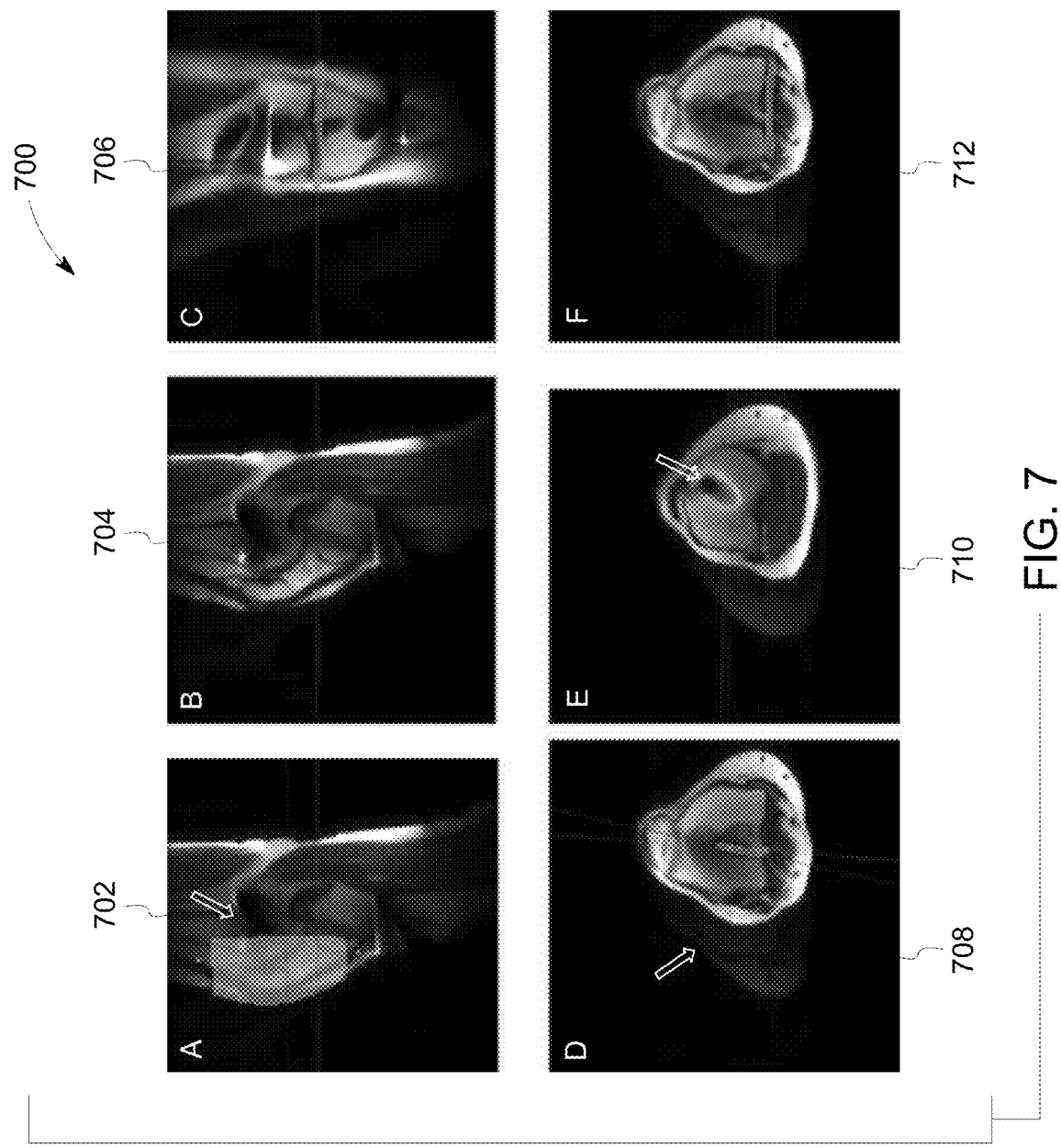
FIG. 7 is a schematic diagram depicting medical images generated by the MRI system of FIG. 1 in accordance with an embodiment of the present technique.

FIG. 7 shows a schematic diagram 700 depicting medical images generated by an MRI system (e.g., System 10 of FIG. 1) in accordance with an embodiment of the present technique. In general, FIG. 7 shows medical images 702, 704, 706, 708, 710 and 712 corresponding to Sagittal Coverage mask, Mensicus plane Sagittal, Mensicus plane coronal, Femoral Condyle Inner Lateral Plane (FCIL), Tibia plane and Femoral Coronal Plane (FCP) respectively. It can be seen from these medical images, that even in the presence of metal artifacts, the present technique is able to show the landmarks (horizontal lines) quite accurately. It should be noted that in images 702 and 710, the arrows point to the metal region (i.e., white halo), whereas in image 708, the arrow points to the ghost region (i.e., dark portion).

Figure 8:
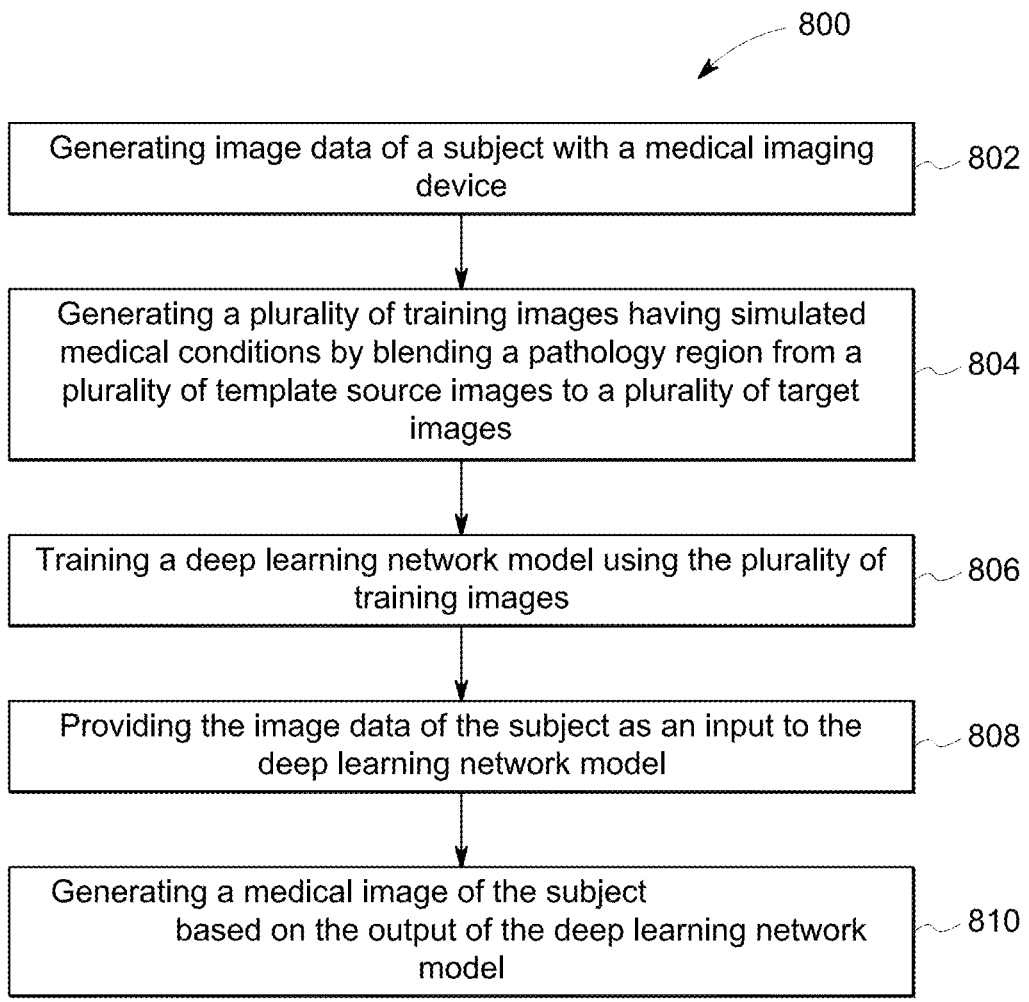
FIG. 8 is a flowchart depicting a method for imaging a subject in accordance with an embodiment of the present technique.

FIG. 8 shows a flowchart depicting a method 800 for imaging a subject in accordance with an embodiment of the present technique. At step 802, the method includes generating image data of a subject with a medical imaging device. In one embodiment, the medical imaging device includes an MRI system. The image data generated by the MRI system may include artifacts due to medical conditions present in the subject body. Therefore, the method includes processing the image data to reduce the artifacts or to classify these images even in presence of these artifacts.

At step 804, the method includes generating a plurality of training images having simulated medical conditions by blending a pathology region from a plurality of template source images to a plurality of target images. The template source images may be obtained from a database of historical images of patients having metal implants such as screws located in their knees or bone fractures etc. Further, the target images are selected from a set of patient images having no medical conditions. Moreover, in method 800, blending the pathology region comprises deriving segmentation masks of the pathology region from the plurality of template source images and processing the segmentation masks. In one embodiment, processing the segmentation masks includes image registration, landmark matching, histogram matching, or combinations thereof between the segmentation masks and target images. Further, the blending includes an augmentation process where the segmentation masks are augmented at landmark points or regions of interest in target images. The augmentation process includes transforming the segmentation masks undergo a series of transformations before being pasted on the region of interest of the plurality of target images. In one embodiment, the region of interest of the plurality of target images may be determined using attention maps derived from another machine learning network or based on regions most likely to have the medical condition e.g., surgical implants. In another embodiment, region of interest of the plurality of target images may be determined using ground truth marking on the plurality of target images or using an atlas based method. The series of transformations include rotation, resizing and elastic deformation of the segmented metal regions.

The method 800 further includes training a deep learning network model using the plurality of training images at step 806. The image data from step 802 is provided as an input to the trained deep learning network model at step 808. Finally, at step 810, a medical image of the subject is generated based on the output of the deep learning network model.

The advantages of the present technique include providing flexibility to the user to synthesize the patient condition at locations of interest as driven by the task or the deep learning features guiding the task. The technique also overcomes the computational complexity of synthesizing such data using bio-physical models (susceptibility simulation in MR for metal etc.) or data complexity (various patient conditions and correspondences) and inflexibility (image intensity, blending ratio etc.) for deep learning based synthesis.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A medical imaging system comprising:
   at least one medical imaging device providing image data of a subject;
   a processing system programmed to:
   generate a plurality of training images having simulated medical conditions, wherein the medical conditions include metal implants;
   train a deep learning network model using the plurality of training images;
   input the image data of the subject to the deep learning network model; and
   generate a medical image of the subject based on the output of the deep learning network model;
   wherein the processing system is programmed to generate the plurality of training images by blending a pathology region from a plurality of template source images to a plurality of target images; and
   wherein the deep learning network model is trained to reduce artifacts in the image data corresponding to metal implants.

2. The medical imaging system of claim 1, wherein the plurality of template source images includes representative examples of medical conditions of the patient and wherein the plurality of target images is selected from a set of images having no medical conditions.

3. The medical imaging system of claim 2, wherein the processing system is programmed to determine the pathology region from the plurality of template source images by deriving segmentation masks of the pathology region from the plurality of template source images.

4. The medical imaging system of claim 3, wherein the processing system is programmed to blend the pathology region by processing the segmentation masks, wherein the processing includes image registration, landmark matching, histogram matching, or combinations thereof between the segmentation masks and the plurality of target images.

5. The medical imaging system of claim 4, wherein the processing system is programmed to blend the pathology region by pasting the processed segmentation masks on a region of interest of the plurality of target images.

6. The medical imaging system of claim 5, wherein the processing system is programmed to determine the region of interest based on ground truth marking on the plurality of target images or using an atlas based method.

7. The medical imaging system of claim 5, wherein the processing system is programmed to determine the region of interest using attention maps derived from another machine learning network or based on regions most likely to include medical conditions.

8. The medical imaging system of claim 5, wherein the segmentation masks undergo a series of transformations before being pasted on the region of interest of the plurality of target images.

9. The medical imaging system of claim 8, wherein the series of transformations include rotation, resizing and elastic deformation of the segmentation masks.

10. The medical imaging system of claim 5, wherein the processing system is programmed to paste the segmentation masks from one region in the plurality of template source images to a different region in the plurality of target images.

11. The medical imaging system of claim 1, wherein the processing system is programmed to perform a contrast equalization of the plurality of template source images and the plurality of target images for obtaining perceptual smoothness between the plurality of target images and the pasted segmented masks.

12. A method for imaging a subject comprising:
generating image data of the subject with a medical imaging device;
generating a plurality of training images having simulated medical conditions by blending a pathology region from a plurality of template source images to a plurality of target images;
training a deep learning network model using the plurality of training images;
providing the image data of the subject as an input to the deep learning network model;
generating a medical image of the subject based on the output of the deep learning network model;
wherein blending the pathology region comprises pasting segmentation masks of the pathology region on a region of interest of the plurality of target images; and
wherein the method further comprises performing a contrast equalization of the plurality of template source images and the plurality of target images for obtaining perceptual smoothness between the plurality of target images and the pasted segmentation masks.

13. The method of claim 12, wherein the plurality of target images is selected from a set of images having no medical conditions and wherein the plurality of template source images includes representative examples of the medical conditions of the subject.

14. The method of claim 13, wherein determining the pathology region from the plurality of template source images comprises deriving segmentation masks of the pathology region from the plurality of template source images.

15. The method of claim 14, wherein the blending the pathology region comprises processing the segmentation masks, wherein the processing includes image registration, landmark matching, histogram matching, or combinations thereof between the segmentation masks and the plurality of target images.

16. The method of claim 12, wherein the region of interest is determined based on ground truth marking on the plurality of target images or using an atlas based method.

17. The method of claim 12, wherein the segmentation masks undergo a series of transformations before being pasted on the region of interest of the plurality of target images.

18. The method of claim 17, wherein the series of transformations include rotation, resizing and elastic deformation of the segmentation masks.

* * * * *